US011350424B2

(12) United States Patent
Macmullan et al.

(10) Patent No.: US 11,350,424 B2
(45) Date of Patent: May 31, 2022

(54) SYSTEMS AND METHODS FOR DETERMINING CHANNEL AVAILABILITY BY AN AUTOMATED FREQUENCY COORDINATION SYSTEM

(71) Applicant: Federated Wireless, Inc., Arlington, VA (US)

(72) Inventors: Samuel Jay Macmullan, Carlisle, MA (US); Michael Oliver Ghorbanzadeh, Annandale, VA (US); James Ni, Medford, MA (US); Kurt Schaubach, Arlington, VA (US)

(73) Assignee: Federated Wireless, Inc., Arlington, VA (US)

( * ) Notice: Subject to any disclaimer, the term of this patent is extended or adjusted under 35 U.S.C. 154(b) by 0 days.

(21) Appl. No.: 17/087,997

(22) Filed: Nov. 3, 2020

(65) Prior Publication Data

US 2021/0144724 A1    May 13, 2021

Related U.S. Application Data

(60) Provisional application No. 62/931,871, filed on Nov. 7, 2019.

(51) Int. Cl.
*H04W 16/14* (2009.01)
*H04W 72/08* (2009.01)
*H04W 72/04* (2009.01)

(52) U.S. Cl.
CPC ......... *H04W 72/082* (2013.01); *H04W 16/14* (2013.01); *H04W 72/0453* (2013.01)

(58) Field of Classification Search
CPC ...................... H04W 72/082; H04W 72/0453; H04W 16/14
(Continued)

(56) References Cited

U.S. PATENT DOCUMENTS 10,009,910 B2 *  6/2018  Reis .................... H04W 52/243
10,178,553 B2 *  1/2019  Ojanen ................. H04W 12/06
(Continued)

OTHER PUBLICATIONS

International Search Report and Written Opinion issued in corresponding PCT Application No. PCT/US20/58671, dated Feb. 1, 2021 (18 pages).

*Primary Examiner* — Hai V Nguyen
(74) *Attorney, Agent, or Firm* — Finnegan, Henderson, Farabow, Garrett & Dunner LLP

(57) ABSTRACT

Methods are provided for managing frequency channels in a shared spectrum available to a radio local access network (RLAN) access point (AP) in a wireless network. The methods may comprise receiving a request for channel availability from the RLAN AP to access the shared spectrum, computing, based on a plurality of parameters associated with the RLAN AP, an RLAN service area (RSA) associated with the RLAN AP, retrieving one or more incumbent protection contours (IPCs) associated with one or more incumbent users in the wireless network, identifying an IPC, among the one or more retrieved IPCs, that overlaps with the RSA associated with the RLAN AP, determining, based on the identified IPC, available frequency information corresponding to the received request for channel availability, and transmitting, to the RLAN AP, a channel availability response comprising the available frequency information.

21 Claims, 9 Drawing Sheets

(58) Field of Classification Search
USPC .................................................. 455/501, 63.1
See application file for complete search history.

(56) References Cited

U.S. PATENT DOCUMENTS

| | | | | |
|---|---|---|---|---|
| 10,470,051 | B2* | 11/2019 | Zhao | H04W 16/14 |
| 2017/0188377 | A1* | 6/2017 | Reis | H04W 52/0209 |
| 2017/0339518 | A1* | 11/2017 | Do | H04W 4/02 |
| 2017/0353857 | A1* | 12/2017 | Ojanen | H04W 76/11 |
| 2018/0213409 | A1* | 7/2018 | Zhao | H04W 16/18 |
| 2018/0242165 | A1 | 8/2018 | MacMullan et al. | |

* cited by examiner

SYSTEMS AND METHODS FOR DETERMINING CHANNEL AVAILABILITY BY AN AUTOMATED FREQUENCY COORDINATION SYSTEM

CROSS-REFERENCE TO RELATED APPLICATIONS

This application claims the benefit of U.S. Provisional Application Ser. No. 62/931,871, filed on Nov. 7, 2019, the disclosure of which is hereby incorporated by reference in its entirety.

TECHNICAL FIELD

The present invention relates to techniques for shared spectrum access in wireless networks and, more particularly, to methods, systems, and apparatuses for determining channel availability in a shared spectrum to prevent excess interference to at least some users of the shared spectrum.

BACKGROUND

Radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party (i.e., cellular operator) receives one or more frequency assignments, in the form of a license, to operate a radio transmitter on specific frequency channels within a particular geographic location.

The system of spectrum allocation, allotment, and assignment is failing to keep pace with the increasing demand for spectrum. There is, therefore, a need to improve how the available spectrum can be efficiently allocated, allotted, and assigned in the face of growing demand. Unless otherwise noted, "allocation" is used in the present disclosure to generally refer to the process by which spectrum is allocated, allotted, and assigned.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to unlicensed spectrum, such as Television Whitespace (TVWS). Coordinating and managing multi-user access to a shared spectrum present challenges in a DSA system.

There has been research and development of computer-automated techniques for the optimization and organization of spectrum allocation in standalone wireless networks, e.g., Self-Organizing Network (SON) techniques in $3^{rd}$ Generation Partnership Project (3GPP) networks. A SON may comprise one or more interconnected standalone networks, e.g., sharing access to at least one SAS. These standalone networks typically use a single radio access technology, such as described in the 3GPP standards for Long Term Evolution (LTE). Further, these networks are usually managed by a single operator, e.g., Verizon or AT&T, which has an exclusive license to use a portion of spectrum in a geographical area.

As wireless demands grow, shared spectrum usage is becoming more common, e.g., in TVWS bands and in the 3.5 GHz Federal band. In these environments, a SAS may control spectrum access among users assigned to different priority levels (or "tiers") of spectrum-access privileges. The SAS may implement spectrum management policies for users in each tier. For example, the SAS may be configured to protect spectrum usage by higher-priority "primary users" in shared bands from harmful interference that would result from communications by lower-priority "secondary users." In some cases, such high-priority users may comprise "incumbent" users, such as military or other government users, that had access to a spectrum before that spectrum was shared with other "non-incumbent" users. As used herein, a "user" may refer to a user equipment (such as a mobile phone) or a person using a user equipment as will be apparent in context. In many cases where there are relatively few primary users, spectrum usage by primary users is low, so secondary users can dominate overall resource usage. Nonetheless, in regions with primary users, the SAS should ensure that any spectrum allocations to secondary users will not create unacceptable levels of interference with the primary users.

To assist the SAS with spectrum management, base stations serving secondary users are often required by regulation (e.g., FCC requirements) to share their operating parameters (e.g., location, antenna characteristics, desired operating power, air interface technology, requested data rates) and measurements (e.g., neighboring base station interference, overall interference, bit/block/frame error rates, latencies, buffer status) with the SAS. Secondary users may also opt to share operating parameters and measurements with the SAS, since such sharing may result in improved secondary user performance.

Citizens Broadband Radio Service (CBRS) shared-spectrum systems are currently being deployed to provide commercial use of 150 MHz of spectrum in the 3.5 GHz band, and new bands such as the 6 GHz band (5.925 to 7.125 GHz) may soon be available for shared spectrum use. To expedite the rollout of services in new shared spectrum bands, software systems used to coordinate shared access of these bands and protect band incumbents must be simple and capable of rapidly determining spectrum availability at a particular location. Moreover, what is needed is a solution tailored to 6 GHz shared spectrum coordination using an approach that also may be easily adjusted for use in other bands, e.g., by modifying the propagation model, protected incumbents, and protection criteria.

A wireless communication device is generally referred to herein as a radio local access network (RLAN) access point (AP), whereas a shared spectrum controller (e.g., SAS) is referred to herein as an Automatic Frequency Coordinator (AFC) system. In some implementations, the wireless network may comprise one or more 6 GHz RLAN APs and the AFC system may be a shared spectrum controller, such as an SAS, for managing access to frequency channels in the 6 GHz spectrum. As used herein, RLAN APs may comprise non-incumbent users that share access to spectrum with higher-priority incumbent users in a wireless network. Additionally or alternatively, as used herein, RLAN AP may refer to an RLAN AP which may comprise a transmitter and a receiver, whereas a Radio LAN may refer to a wireless network.

More than 100,000 incumbents of the 6 GHz band that require protection from interference caused by an RLAN AP are registered in the Federal Communications Commission (FCC) Universal Licensing System (ULS) database. The ULS database includes, for example, the location, frequency, and other characteristics of incumbent receivers that should be protected from interference from other users. Additional incumbents, e.g., those not included in the ULS database, can also be protected or otherwise given incumbent-associated protection criteria.

SUMMARY

The present invention overcomes the disadvantages of the prior art by providing techniques for determining frequency channels in a shared spectrum that are available to at least one RLAN AP in a wireless network. AFC systems need to protect, for example, 6 GHz incumbent receivers from harmful interference from transmissions from RLAN APs and user equipments (UEs) supported by respective RLAN APs. In view of the increasing demand for spectrum while protecting incumbent receivers from interference resulting from non-incumbent RLAN AP transmissions in a wireless network, the exemplary embodiments disclosed herein provide a shared-spectrum AFC system that, unlike prior systems, can calculate and determine channel availability in the shared spectrum, for example, based on reported parameters associated with the RLAN APs and/or incumbent information. The disclosed embodiments may be used by one or more AFC systems to provide incumbent-protection methods and techniques consistent with this disclosure.

The disclosed embodiments comprise, for example, methods, systems, and computer-readable mediums that may be used by one or more AFCs for managing frequency channels in a shared spectrum available to an RLAN AP in a wireless network. The disclosed embodiments may include at least one AFC configured to receive a request for channel availability from the RLAN AP to access the shared spectrum, compute, based on a plurality of parameters associated with the RLAN AP, an RLAN service area (RSA) associated with the RLAN AP, retrieve one or more incumbent protection contours (IPCs) associated with one or more incumbent users in the wireless network, identify an IPC, among the one or more retrieved IPCs, that overlaps with the RSA associated with the RLAN AP, determine, based on the identified IPC, available frequency information corresponding to the received request for channel availability, and transmit, to the RLAN AP, a channel availability response comprising the available frequency information.

In some embodiments, the computed RSA may comprise an outer contour that bounds an area surrounding the RLAN AP in which user equipments (UEs) associated with the RLAN AP operates. In accordance with some embodiments of the present disclosure, the AFC system may be further configured to compute the RSA to account for position uncertainty of the RLAN AP. In addition, in some embodiments, the one or more IPCs may comprise an outer contour that bounds an area around a respective incumbent user where an RLAN AP or a UE associated with an RLAN AP causes interference above a predetermined threshold. The predetermined threshold may comprise an interference-to-noise power ratio (I/N) received by the respective incumbent user from the RLAN AP or the UE associated with the RLAN AP. In other embodiments, the one or more IPCs may be pre-computed for the one or more incumbent users of the shared spectrum. For example, the one or more IPCs may be pre-computed based on an effective isotropic radiated power (EIRP) of the RLAN AP, an above ground level (AGL) height of the RLAN AP antenna, a device category of the RLAN AP, or a land category of the RLAN AP.

In addition, the plurality of parameters associated with the RLAN AP may comprise at least one of a location of the RLAN AP, an effective isotropic radiated power (EIRP) of the RLAN AP, an above ground level (AGL) height of the RLAN AP antenna, a horizontal uncertainty of the RLAN AP, a vertical uncertainty of the RLAN AP, a cell edge receive signal level (RSL) of the RLAN AP, an RSA propagation model (RPM) of the RLAN AP, a land category of the RLAN AP, or a device category of the RLAN AP. In other embodiments, the AFC system may be further configured to calculate an interference from the RLAN AP or a UE associated with the RLAN AP to an incumbent user of the one or more incumbent users using a link budget. For example, in some embodiments, the interference may be calculated based on an effective isotropic radiated power (EIRP) transmitted by the RLAN AP or the UE in a direction of the incumbent user, a path loss between the RLAN AP or the UE and the incumbent user, and an antenna gain of the incumbent user in a direction of the RLAN AP or the UE.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION OF DISCLOSED EMBODIMENTS

Figure 1:
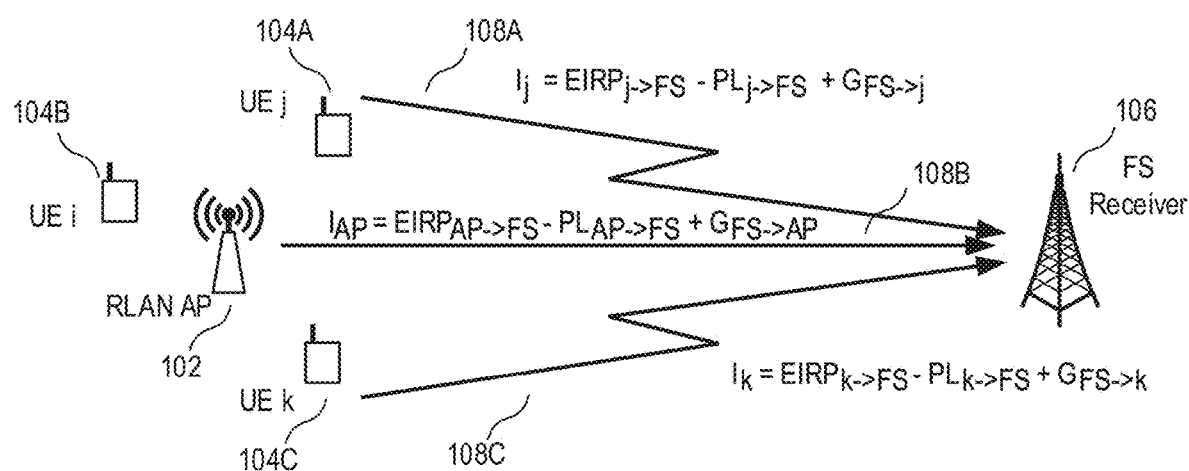
FIG. 1 depicts a schematic diagram illustrating interferences from an exemplary RLAN AP and UEs associated with the RLAN AP to an exemplary incumbent user in accordance with certain disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 illustrates a schematic diagram illustrating interferences from an exemplary RLAN AP and UEs associated with the RLAN AP to an exemplary incumbent user in accordance with certain disclosed embodiments. RLAN APs and their clients, e.g., UEs associated with respective RLAN APs, may cause interference to an incumbent user due to their transmissions. Accordingly, a shared spectrum controller such as an AFC system must ensure that the RLAN APs and their clients do not cause excess interference to the incumbent user. As shown in FIG. 1, for example, system 100 may comprise an RLAN AP 102, a plurality of UEs 104A-C associated with RLAN AP 102, and a Fixed Service (FS) receiver 106, e.g., an incumbent user. RLAN AP 102 as well as UEs 104A-C associated with RLAN AP 102 may cause interference 108A-C to FS receiver 106 due to their transmissions. Interference 108A-C, for example, may be defined in terms of the interference-to-noise power ratio (I/N) received by FS receiver 106 from each of RLAN AP 102 and UEs 104A-C.

In some embodiments, interference may be calculated using a reference incumbent protection methodology (R-IPM). Using the R-IPM, interference 108A-C from each of RLAN AP 102 and UEs 104A-C may be calculated using a link budget. For example, the interference (I) may be calculated using the following equation:

$$I = EIRP - PL + G$$

where EIRP (measured in dBm) is the effective power transmitted by one of RLAN AP 102 and UEs 104A-C in the direction of FS receiver 106, PL (measured in dB) is the path loss between one of RLAN AP 102 and UEs 104A-C and FS receiver 106, and G is the antenna gain (measured in dB) associated with FS receiver 106 in the direction of one of RLAN AP 102 and UEs 104A-C. The effective noise power (N) is estimated from a noise figure of FS receiver 106. For example, the effective noise power (N) of FS receiver 106 may be about 5 dB.

In the R-IPM link budget, the AFC system may utilize one or more parameters associated with RLAN AP 102 to determine channel availability. For example, the AFC system may utilize parameters, including but not limited to, a 3D location associated with RLAN AP 102, such as latitude, longitude, antenna Above Ground Level (AGL) height, category (e.g., indoor or outdoor), and location uncertainty associated with RLAN AP 102. Based on one or more of these parameters, the AFC system may determine frequency channel availability and transmit a frequency channel availability information to RLAN AP 102 with, for example, 1 MHz resolution for a given RLAN EIRP.

Referring back to FIG. 1, the AFC system may calculate interference 108A-C received by FS receiver 106 from each of RLAN AP 102 and UEs 104A-C in order to determine frequency channel availability information. For example, using the equation above, interference 108B from RLAN AP 102 ($I_{AP}$) at FS receiver 106 may be calculated as $EIRP_{AP \to FS} - PL_{AP \to FS} + G_{FS \to AP}$. In addition, interference 108A from $UE_j$ 104A ($I_j$) may be calculated as $EIRP_{j \to FS} - PL_{j \to FS} + G_{FS \to j}$. Similarly, interference 108C from $UE_k$ 104C ($I_k$) may be calculated as $EIRP_{k \to FS} - PL_{k \to FS} + G_{FS \to k}$. The AFC system must ensure that each of $I_{AP}$, $I_j$, and $I_k$ is less than or equal to a predetermined threshold ($(I/N)_{threshold}$) in order to prevent excess interference to FS receiver 106. In some embodiments, the predetermined threshold ($(I/N)_{threshold}$) may be provided by the Interference Protection Criteria.

In some embodiments of the present disclosure, the AFC system may use alternative methods to ensure that an RLAN AP and its clients do not cause excess interference to an incumbent user in a wireless network. For example, in order to reduce AFC system and/or RLAN complexity, decrease message latency, or improve AFC system reliability and stability, the AFC system may use an RLAN service area (RSA) and/or Incumbent Protection Contours (IPCs) to determine frequency channel availability in a shared spectrum while preventing excess interference to an incumbent user.

An RSA, for example, may comprise an outer contour that bounds the area surrounding an RLAN AP, in which all associated clients or UEs associated with the RLAN AP may operate. In some embodiments, the RSA may account for any RLAN AP position uncertainty. With the RSA defined, the AFC system may not need location information associated with each UE associated with an RLAN AP. Rather, the AFC system may protect each incumbent user from interference emanating from any point within the outer contour defined by the RSA. The use of the RSA, while conservatively protecting the incumbent user, may eliminate the need for the AFC system to use specific UE positions in determining channel availability information. In addition, the use of the RSA may avoid the complexity of geolocating all UEs and reporting each UE location to the AFC system.

Additionally or alternatively, IPCs may be used to determine frequency channel availability. Link budget calculations, such as those shown in FIG. 1, may require intensive processing and, as such, require a large database with high-resolution geodata such as terrain data, clutter or land cover categories and heights, and 3D building polygons. Accordingly, real-time link budget calculations may add substantial latency to channel availability calculations, particularly if there is a large number of incumbent users requiring protection from RLAN APs and their clients. Pre-computed IPCs, however, may eliminate the need for real-time link budget calculations by the AFC system. An IPC, for example, may comprise an outer contour that bounds the location surrounding the incumbent user where an RLAN AP or one or more UEs associated with the RLAN AP may cause excess interference relative to the predetermined interference threshold ($(I/N)_{threshold}$) at the incumbent user. The IPC may be determined based on, for example, an EIRP and antenna AGL height associated with an RLAN AP. For example, interference at the incumbent user may increase with RLAN AP EIRP, given proposed AFC system propagation models and antenna AGL height. Accordingly, the AFC system may use the closest, but higher, values for EIRP and antenna AGL height relative to reported parameter values associated with the RLAN AP.

Figure 2:
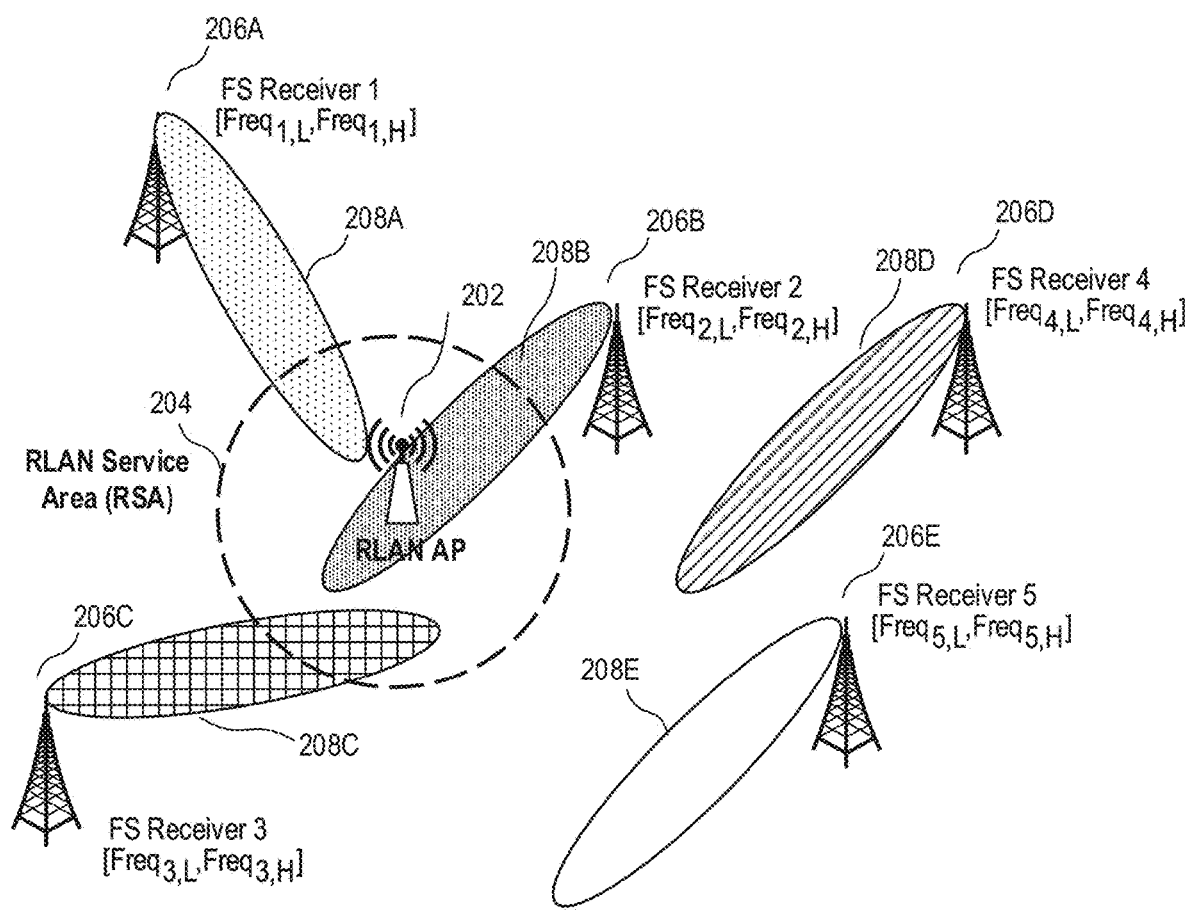
FIG. 2 depicts a schematic diagram of an exemplary method of using an exemplary RSA and exemplary IPCs to determine channel availability in accordance with certain disclosed embodiments.

Given a computed RSA and one or more IPCs, the AFC system may determine frequency channel availability in a shared spectrum based on contour overlaps between the computed RSA and the one or more IPCs. For example, FIG. 2 depicts a schematic diagram of an exemplary method of using an exemplary RSA and exemplary IPCs to determine channel availability in accordance with certain disclosed embodiments. As shown in FIG. 2, system 200 may comprise an RLAN AP 202 and a plurality of incumbent users, such as FS receivers 206A-E.

As discussed above, the AFC system may compute an RSA 204 associated with RLAN AP 202. The outer contour of RSA 204 may bound the area surrounding RLAN AP 202, in which all associated clients or UEs associated with the RLAN AP 202 may operate. In some embodiments, RSA 204 may account for any RLAN AP 202 position uncertainty. The AFC system may also determine pre-computed IPCs 208A-E associated with each respective FS receivers 206A-E. The outer contours of IPCs 208A-E may bound locations surrounding each respective FS receivers 206A-E where RLAN AP 202 (or one or more UEs associated with RLAN AP 202) may cause excess interference relative to the predetermined interference threshold $((I/N)_{threshold})$ at each respective FS receivers 206A-E. IPCs 208A-E may be determined based on, for example, an EIRP and antenna AGL height associated with RLAN AP 202. For example, interference at each of FS receivers 206A-E may increase with EIRP of RLAN AP 202, given proposed AFC system propagation models and antenna AGL height of RLAN AP 202.

Based on the computed RSA 204 and pre-computed IPCs 208A-E, the AFC system may determine channel availability based on contour overlaps. For example, the AFC system may identify any overlaps between RSA 204 and the IPCs 208A-E. As seen in FIG. 2, RSA 204 overlaps with IPCs 208A-C associated with FS receivers 206A-C, respectively. Accordingly, since RSA 204 overlaps with IPCs 208A-C, the operating frequency intervals of FS receivers 206A-C would be unavailable for RLAN AP 202. Since FS receivers 206A-C operate on frequency intervals [Freq$_{1,L}$, Freq$_{1,H}$], [Freq$_{2,L}$, Freq$_{2,H}$], and [Freq$_{3,L}$, Freq$_{3,H}$], respectively, these operating frequency intervals would be unavailable for use by RLAN AP 202 given the location of RLAN AP 202. As such, by using computed RSA and IPCs, the AFC system can quickly and easily determine channel availability for an RLAN AP based on contour overlaps between the RSA and the IPCs.

Figure 3:
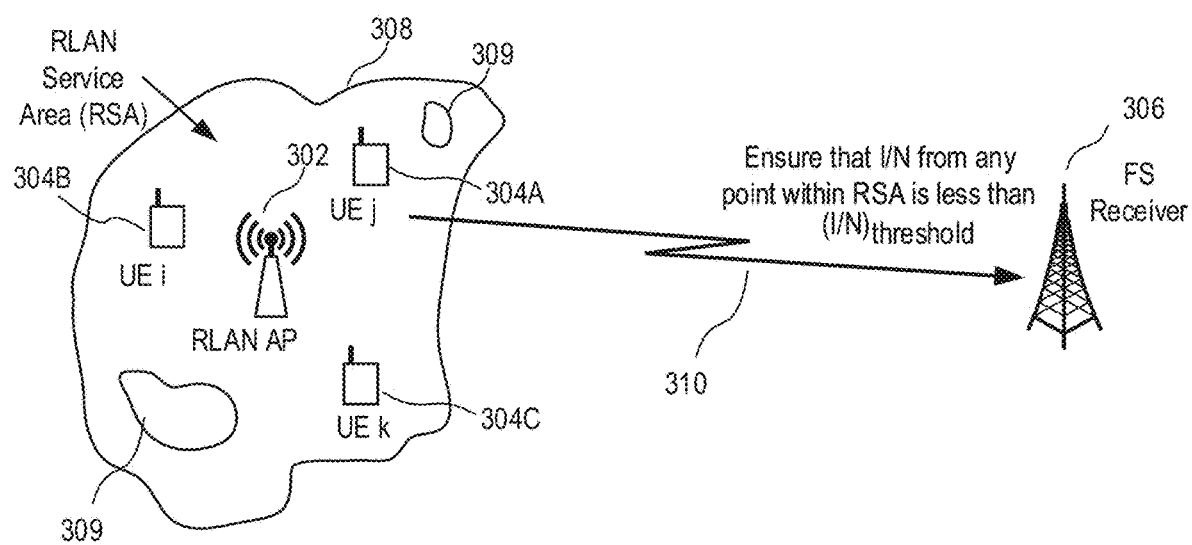
FIG. 3 depicts a schematic diagram of another exemplary RSA that can be used to determine channel availability in accordance with certain disclosed embodiments.

In some embodiments, the RSA, such as RSA 204 of FIG. 2, may be determined by the limit at which a UE can receive control signals from the serving RLAN AP. This limit can be determined based on a cell-edge receive signal level (RSL), for example, on the order of −95 dBm/MHz, and link budget calculations. For example, FIG. 3 depicts another exemplary RSA 308 that can be used to determine channel availability in accordance with certain disclosed embodiments. As shown in FIG. 3, system 300 may comprise an RLAN AP 302, a plurality of UEs 304A-C served by RLAN AP 302, and an incumbent user, such as FS receiver 306. The AFC system may compute RSA 308 based on the limit at which each UE 304A-C can receive control signals from RLAN AP 302. The limit can be determined based on a cell-edge RSL and link budget calculations. Accordingly, the AFC system may protect FS receiver 306 from interference 310 emanating from all points within RSA 308. That is, the AFC system may ensure that interference 310 emanating from any point within RSA 308 is less than or equal to the predetermined interference threshold $((I/N)_{threshold})$ amount associated with FS receiver 306.

While the RSA may be represented as a circular contour around an RLAN AP, such as RSA 204 of FIG. 2, the RSA may be represented by any geometric shape. For example, as seen in FIG. 3, RSA 308 may be represented as a multi-polygon. Additionally or alternatively, RSA 308 computed by the AFC system may comprise one or more holes 309. Holes 309 may be areas within RSA 308 at which no UEs receive control signals from the serving AP, such as RLAN AP 302. The AFC system may take holes 309 within RSA 308 into consideration when determining whether interference emanating from RSA 308 exceeds the predetermined interference threshold $((I/N)_{threshold})$ amount associated with FS receiver 306. Accordingly, the AFC system may take holes 309 into consideration when determining frequency channels that are available for use by RLAN AP 302. In other embodiments, the AFC system may ignore the holes 309 and use the outer contour of RSA 308 to determine channel availability. In some embodiments, RSA 308 may represent the uncertainty of the estimated location (i.e., position uncertainty) of RLAN AP 302. For example, RLAN AP 302 may be a Wi-Fi AP or a cellular base station, and the locations of UEs 304A-C may be ignored in computing RSA 308 associated with RLAN AP 302.

Figure 4:
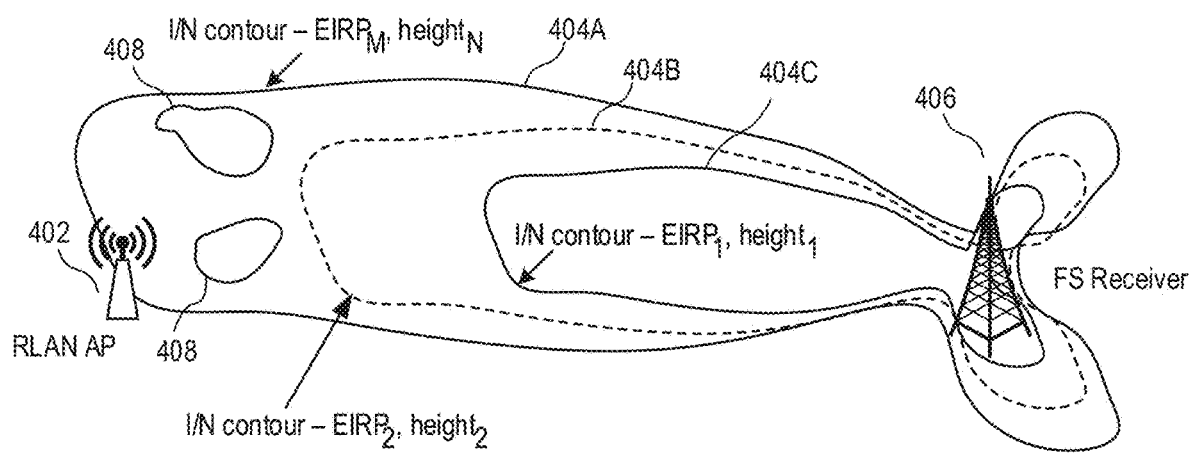
FIG. 4 depicts a schematic diagram of another exemplary IPCs that can be used to determine channel availability in accordance with certain disclosed embodiments.

In some embodiments, IPCs may be pre-computed based on EIRP and height associated with an RLAN AP. Referring to FIG. 4, for example, another exemplary IPCs that can be used to determine channel availability in accordance with certain disclosed embodiments is provided. System 400 may comprise an RLAN AP 402 and an FS receiver 406. As seen in FIG. 4, the AFC system may calculate IPCs 404A-C for M RLAN AP EIRPs and N RLAN AP antenna AGL heights. As the interference increases with EIRP, given proposed propagation models and antenna AGL heights, the AFC system may use the closest, but higher, values for EIRP and antenna AGL height relative to reported parameters associated with RLAN AP 402 in order to determine the IPCs 404A-C.

While an IPC may be represented as an oval contour around an incumbent user (e.g., FS receiver), such as IPCs 206A-E of FIG. 2, the IPC may be represented by any geometric shape. For example, as seen in FIG. 4, IPCs 404A-C may be represented as a multi-polygon. Additionally or alternatively, IPCs 404A-C may comprise one or more holes 408. Holes 408 may be areas within an IPC, such as IPC 404A, at which no interference would be received from an RLAN AP, such as RLAN AP 402, or its UEs. The AFC system may take holes 408 within IPC 404A into consideration when determining frequency channels that are available for use by RLAN AP 402. In other embodiments, the AFC system may ignore the holes 408 and use the outer contours of IPCs 404A-C for each RLAN AP EIRP and antenna AGL height to determine channel availability.

Figure 5:
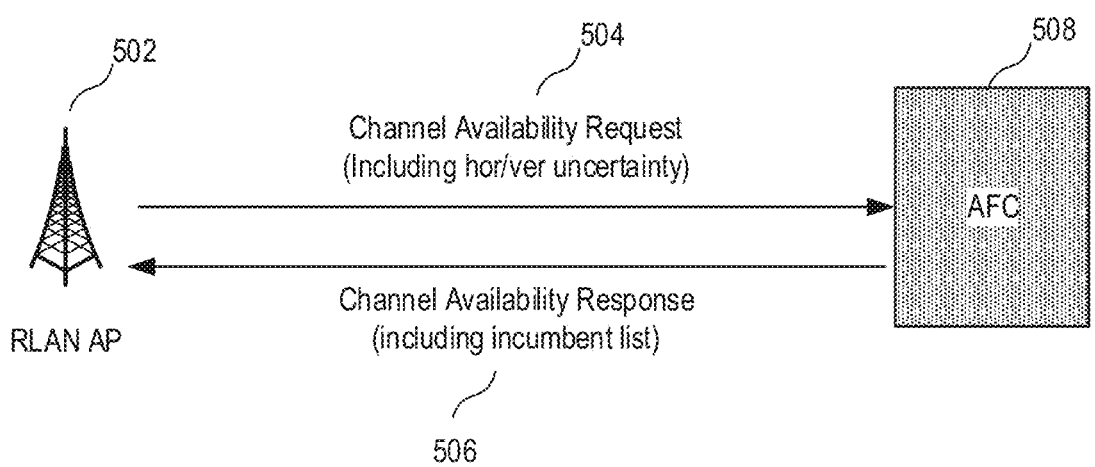
FIG. 5 depicts a schematic diagram of an exemplary channel availability request system that may be used in accordance with certain disclosed embodiments.

FIG. 5 illustrates a schematic diagram of an exemplary channel availability request system 500 that may be used in accordance with certain disclosed embodiments. In system 500, an RLAN AP 502 may request channel availability information and access to a frequency channel in a shared spectrum by sending a message, such as a channel availability request 504, to the AFC system 508 and awaiting a response from the AFC system 508.

In some embodiments, the channel availability request 504 may include one or more parameters associated with RLAN AP 502 that the AFC system 508 may use in order to compute an RSA associated with RLAN AP 502. One or more parameters associated with RLAN AP 502 in the channel availability request 504 may include, for example, an RLAN AP identifier, an RLAN AP location (e.g., the World Geodetic System (WGS84) coordinates), an RLAN AP EIRP (in dBm/MHz), an RLAN AP antenna AGL height (in meters), an RLAN cell edge RSL (in dBm/MHz), an RLAN AP category (e.g., whether the RLAN AP is indoors, outdoors, or mix), an RLAN AP horizontal uncertainty (in meters), and an RLAN AP vertical uncertainty (in meters). In some embodiments, the RLAN AP category may be derived using the National Land Cover Database (NLCD) 2011. The NLCD may provide a code corresponding to the land cover category for grid points within the United States and that are spaced by 1 arc second in latitude/longitude. For example, the AFC system 508 may find the land cover code of the grid point closest to RLAN AP 502 latitude/longitude and translate the code to a land category chosen from {'SUBURBAN', 'URBAN', 'DECIDUOUS', 'CONIFEROUS', 'RURAL'}.

Based on the one or more parameters associated with RLAN AP 502 received in the channel availability request 504, the AFC system 508 may compute the RSA associated with RLAN AP 502. As such, the RSA may be determined by the limit at which a UE associated with RLAN AP 502 can receive control signals from RLAN AP 502. The AFC system 508 may also use the reported parameters associated with RLAN AP 502 to choose a pre-calculated IPC around every incumbent user. Then, the AFC system 508 may control interference levels for high-priority incumbent users, such as FS receivers, based on an IPC surrounding each incumbent user and the computed RSA surrounding RLAN AP 502. For example, the AFC system 508 may determine which IPCs overlap the computed RSA associated with RLAN AP 502, and the permissible RLAN AP operating frequencies may be those where the computed RSA does not collide or overlap with any IPC. By using overlaps between one or more IPCs and one or more RSAs to determine channel availability, the AFC system 508 may reduce its computational complexity compared to prior implementations and can provide responses to channel availability requests from RLAN APs, for example, in less than 1 second.

According to some disclosed embodiments, the AFC system 508 may retrieve IPCs associated with respective incumbent users, such as FS receivers. IPCs may be pre-computed offline based on information obtained by the AFC system 508 from the FCC Universal Licensing System (ULS) and Cable Operations and Licensing System (COALS) about the location, frequency, and other characteristics of the incumbent users. Then, the AFC system 508 may store the pre-computed IPCs in an AFC database. By limiting real-time operations to database accesses and exclusion-zone checks based on stored IPCs, the complexity of the AFC system 508 may be substantially reduced and its responsiveness greatly improved.

As discussed above, an IPC may represent an area over which an RLAN AP operating on an incumbent frequency and transmitting power in the direction of an incumbent user, such as an FS receiver, would cause excess interference to the incumbent user. As shown in FIGS. 2-4, the IPC may correspond to a geographic boundary where the UN levels are above a predetermined I/N threshold value for an incumbent user. Specifically, the IPC may represent the locations where an RLAN AP transmission would cause the overall I/N value at the incumbent user to exceed a predetermined interference threshold $((I/N)_{threshold})$, e.g., which may be −6 dB, 0 dB, or 10 dB in some exemplary embodiments. Such a threshold value may be determined to cause significant degradation to the incumbent user's communications performance.

IPCs for several UN levels (e.g., −6 dB, 0 dB, 10 dB) may be pre-computed offline and stored in the AFC database. The IPC calculation may use the reported RLAN AP EIRP in the direction of the incumbent user, determined from an amount of conducted power and an assumed RLAN AP antenna gain in the direction of the incumbent user. Also employed in the IPC calculation may be one or more of the path loss (PL) between the incumbent user and RLAN AP antenna, the requested RLAN AP frequency, and the incumbent user's antenna gain in the direction of the RLAN AP. In accordance with such disclosed embodiments, a quantity of interference (I) may then be computed, in dBm, using the following equation discussed above:

$$I=EIRP-PL+G$$

Accordingly, the AFC system 508 may use the computed RSA for RLAN AP 502 and pre-computed IPCs retrieved to determine channel availability. Referring back to FIG. 5, in response to the channel availability request 504, the AFC system 508 may return a channel availability response 506 comprising available frequency information to the RLAN AP 502, as shown in FIG. 5. The channel availability response 506 may include, for example, an RLAN AP identifier, such as an identifier associated with RLAN AP 502, and a list of available frequency channels in contiguous frequency increments with 1 Hz resolution.

Figure 6A:
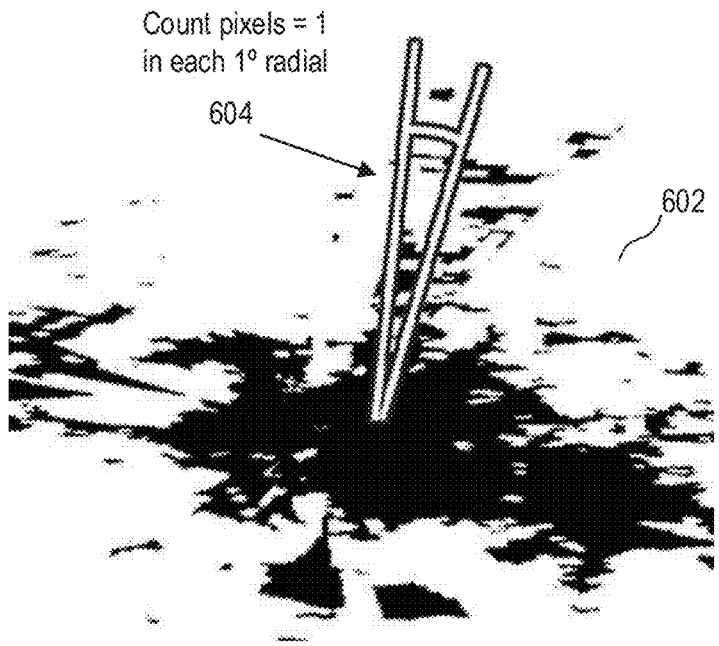
FIG. 6A depicts a schematic diagram illustrating an exemplary method for computing an RSA in accordance with certain disclosed embodiments.
Figure 6B:
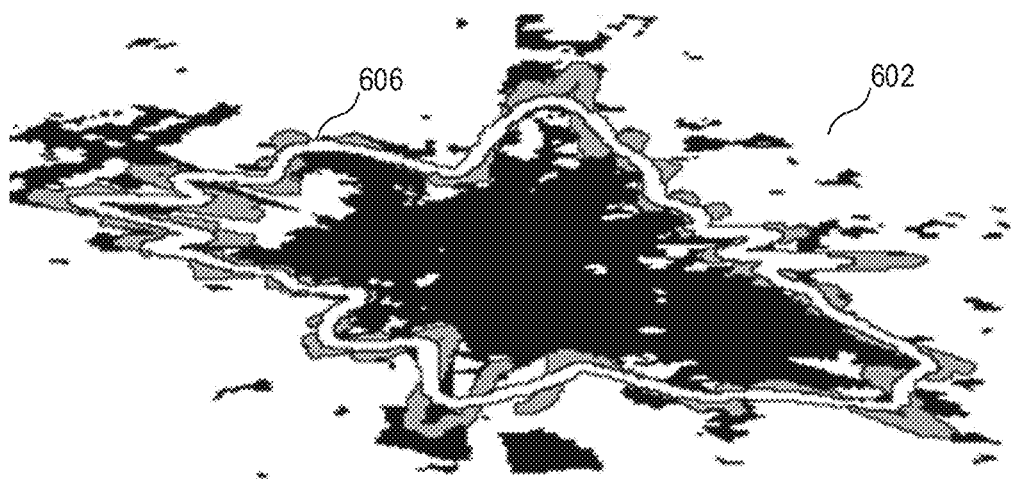
FIG. 6B depicts the RSA computed using the exemplary method of FIG. 6A in accordance with certain disclosed embodiments.

FIGS. 6A-6B depict schematic diagrams illustrating an exemplary method 600 for computing an RSA in accordance with certain disclosed embodiments. As discussed above, the AFC system may compute an RSA based on an estimate of the RLAN AP coverage area determined using, for example, RLAN AP location, RLAN AP height, RLAN AP category, RLAN AP EIRP, RSA propagation models (RPM), and RLAN cell edge RSL. As seen in FIG. 6A, the computation of the RSA may leverage a polar grid 602 formed using 360 1°-spaced radials 604 with azimuths 0°, 1°, . . . , 359° with respect to the True North and extending outward from the location of the RLAN AP along the great circular path. At each point in polar grid 602, a link budget calculation may be performed using the RPM from the RLAN AP assumed at "height=height+vertical uncertainty" to that point and comparing the value of "EIRP−PL" to cell edge RSL value to mark that grid point as "covered" or "uncovered." 25 meter spaced grid points may be evaluated along each radial 604.

As seen in FIG. 6B, in some embodiments, the AFC system may determine a coverage contour 606 associated with an RLAN AP in order to compute the RSA surrounding the RLAN AP. For example, the AFC system may use covered grid points to compute the coverage contour 606 associated with the RLAN AP. The computation of the coverage contour 606 from covered grid points may follow the Citizen Broadband Radio Services (CBRS) Priority Access License (PAL) Protection Area (PPA) creation procedure. Accordingly, the resulting coverage contour 606 may be specified as a length 360° array with each point representing the coverage distance relative to the location of the RLAN AP in a particular angular direction with respect to the True North. The minimum coverage distance in each direction may be 25 meters.

In some embodiments, the AFC system may then determine the RSA by adding the horizontal uncertainty value to the coverage contour 606 determined in FIG. 6B. The horizontal uncertainty value may represent the uncertainty of the RLAN AP position given the RLAN AP geolocation mechanism. To perform the addition of the horizontal uncertainty value, the Inverse Vincenty methodology may be used to find the distance and azimuth of the RLAN AP to its computed RSA points. Then, the Forward Vincenty method may be used to find the horizontal-uncertainty-adjusted RSA, whose points may be the same azimuth as their corresponding points in the original RSA, but at a distance that is larger than the distances of the points in the original RSA by the amount of the horizontal uncertainty value.

Figure 7:
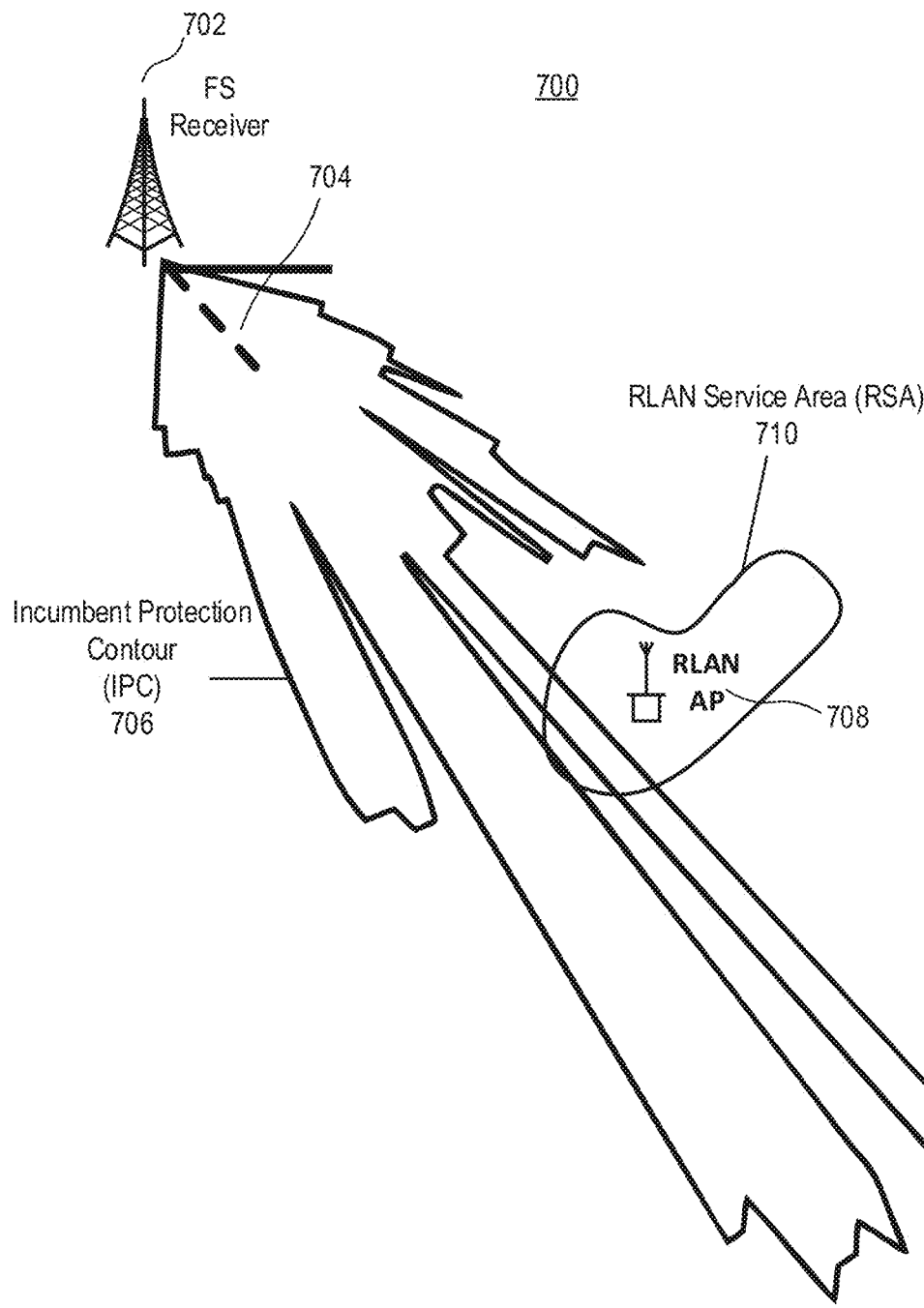
FIG. 7 depicts a schematic diagram illustrating an exemplary method for determining channel availability in accordance with certain disclosed embodiments.

FIG. 7 depicts an exemplary method for determining channel availability in accordance with certain disclosed embodiments. As shown in FIG. 7, the AFC system may store in a database an IPC associated with incumbent user, such as FS receiver 702. FS receiver 702 may be characterized by receiver antenna pointing direction 704. Upon a spectrum availability request from an RLAN AP, such as RLAN AP 708, the AFC system may extract IPC 706. IPC 706 may be derived based on parameters associated with RLAN AP 708 that matches those in the RLAN AP channel availability request. Accordingly, extracted IPC 706 may have RLAN AP parameters that match the parameters specified in the request from RLAN AP 708. The AFC system may compute the RSA 710 based on the parameters specified in the channel availability request from RLAN AP 708. If the RSA 710 overlaps with the IPC 706, then the operating frequencies of FS receiver 702 may be excluded from those declared available by the AFC system in the channel availability response to RLAN AP 708. In some embodiments, the available spectrum contiguous frequency segments may be determined starting with the 6 GHz frequency range (5,925 to 7,125 MHz) and excising any portions occupied by interfered incumbent users.

In some embodiments, the AFC system may compute IPCs for each of the approximately 100,000 6 GHz incumbent users. For each incumbent user, an IPC may be computed given parameters associated with an RLAN AP, including but not limited to, RLAN AP EIRP, RLAN AP antenna AGL height, RLAN AP category, RLAN AP land category, and Incumbent Protection Criteria. As with the RSA computations, the IPC computation may also be based on a set of link budgets to each polar grid point surrounding the incumbent user and subsequent contour creation. The link budget may determine the interference (I), in dBm, from a hypothetical RLAN AP with omnidirectional antenna at AGL height and located at each grid point using the equation:

$$I = EIRP - PL + G$$

where PL (in dB) is computed based on land category and the incumbent protection propagation model (IPM), and G is the incumbent user antenna gain (in dBi) in the direction of the grid point as determined using the incumbent user antenna pattern. For incumbent users other than TV Pickup and Microwave Public Safety Pool, this pattern may be specified per incumbent user (e.g., may be chosen from F.1245, UHX6-59W, UHX12-59), or some other pattern may be determined by the AFC system. In some embodiments, the incumbent user antenna boresight direction may be determined based on the receiver and transmitter locations in the point-to-point incumbent link specified in the ULS or COALS. For TV Pickup and Microwave Public Safety Pool, the receiver antenna pattern may be assumed to be spherical, with receiver gain specified in the ULS. In some embodiments, the effective noise (N) may be estimated in dBm using a 5 dB noise figure.

In some embodiments, the IPC may then be worst-cased using the results in the IPC grid. For example, the furthest-most grid point along each radial, for which the computed interference is less than the predetermined interference threshold $((I/N)_{threshold})$, may then be used as the contour point in the corresponding azimuthal direction. Computing the furthest-most interfered point along each radial may then return a 360-point contour, which may be the IPC.

Figure 8:
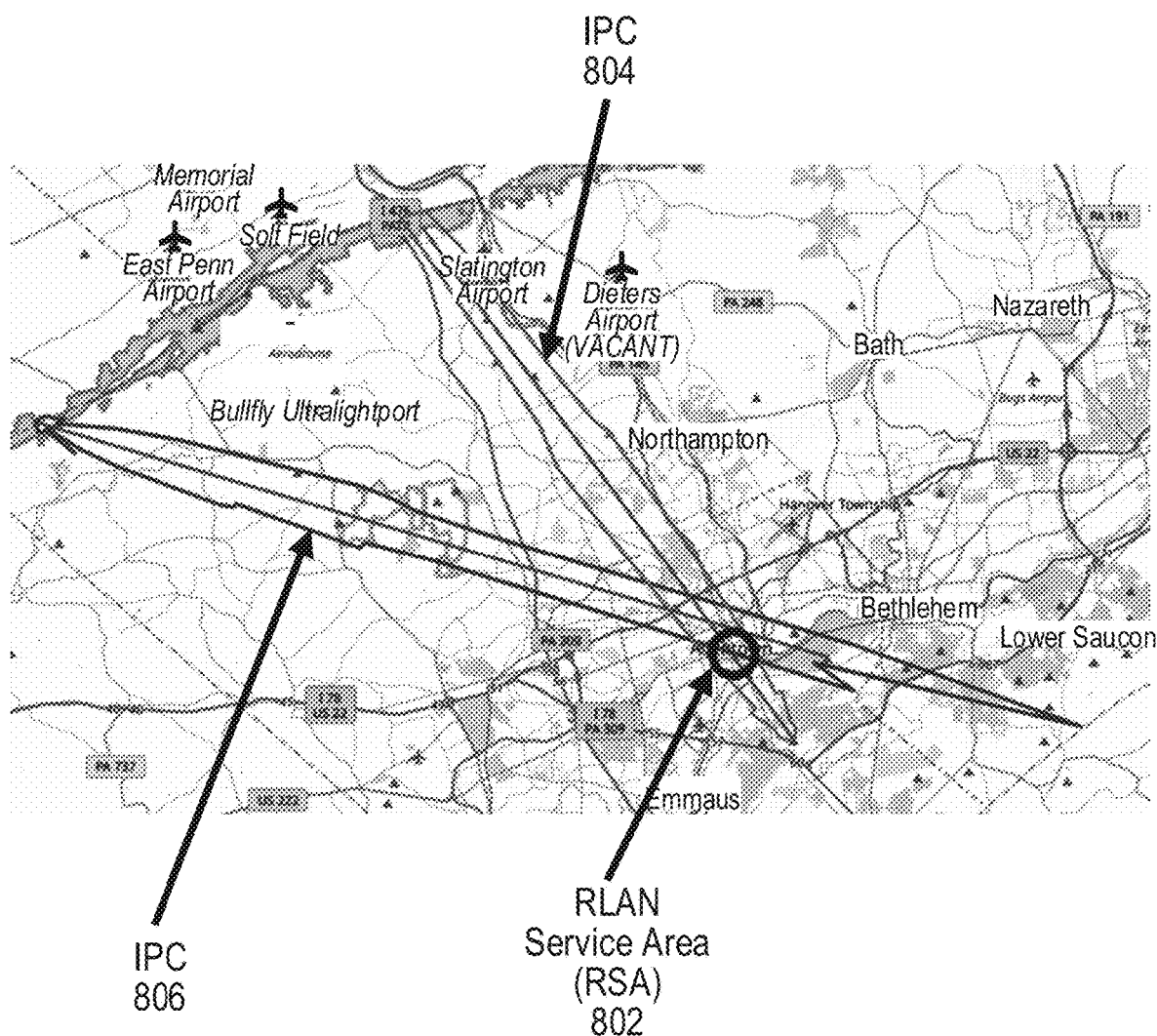
FIG. 8 depicts a schematic diagram illustrating another exemplary method for determining channel availability in accordance with certain disclosed embodiments.

Referring now to FIG. 8, another exemplary approach to determining spectrum availability is depicted, in accordance with the embodiments of the present disclosure. In FIG. 8, an RSA 802 is illustrated by a circle. In addition, two intersecting IPCs 804 and 806 are each defined by I/N=−6 dB. For example, IPC 806 may be associated with callSign WNEX648 and may operate from 6539.75-6597.5 MHz, and IPC 804 may be associated with callSign WQJV440 and may operate from 6802.5-6807.5 MHz. Accordingly, the available frequencies in the 6 GHz range may be 5925-6802.5, 6807.5-6593.75, and 6597.5-7125 MHz.

In some embodiments, the contiguous frequency segments of the available spectrum in the 6 GHz band frequency range from 5,925,000,000 Hz to 7,125,000,000 Hz may be stemmed from excising any portions of the band occupied by incumbent users with which the RLAN AP would interfere.

For example, if the RLAN would interfere with incumbents using frequency spectrum having lower_freq=6,000,000,000 and upper_freq=6,100,000,000 and lower_freq=6,150,000,000 and upper_freq=6,200,000,000, then the available frequency segments would be:

```
"availableSpectrum":[
    {
        "frequencyRange":{
            "lowFrequency":5925000000,
            "highFrequency":6000000000
        },
    {
        "frequencyRange":{
            "lowFrequency":6100000000,
            "highFrequency":6150000000
        },
    {
        "frequencyRange":{
            "lowFrequency":6200000000,
            "highFrequency": 7125000000
        }
]
```

In this example, if the RLAN would interfere with incumbents using frequency spectrum with lower_freq=6,200,000,000 and upper_freq=6,300,000,000 and lower_freq=6,150,000,000 and upper_freq=6,200,000,000, then the available frequency segments would be:

```
"availableSpectrum":[
    {
        "frequencyRange":{
            "lowFrequency":5925000000,
            "highFrequency":6200000000
        },
    {
```

```
            "frequencyRange":{
                "lowFrequency":6300000000,
                "highFrequency": 7125000000
            }
        ]
```

If the RLAN would interfere with incumbents with frequency spectrum having lower_freq=5,925,000,000 and upper_freq=6,300,000,000 and lower_freq=6,450,000,000 and upper_freq=6,500,000,000, the available frequency segments would be:

```
    "availableSpectrum":[
        {
            "frequencyRange":{
                "lowFrequency": 6300000000,
                "highFrequency":6450000000
            }
        },
        {
            "frequencyRange":{
                "lowFrequency": 6500000000,
                "highFrequency": 7125000000
            }
        }
    ]
```

Figure 9:
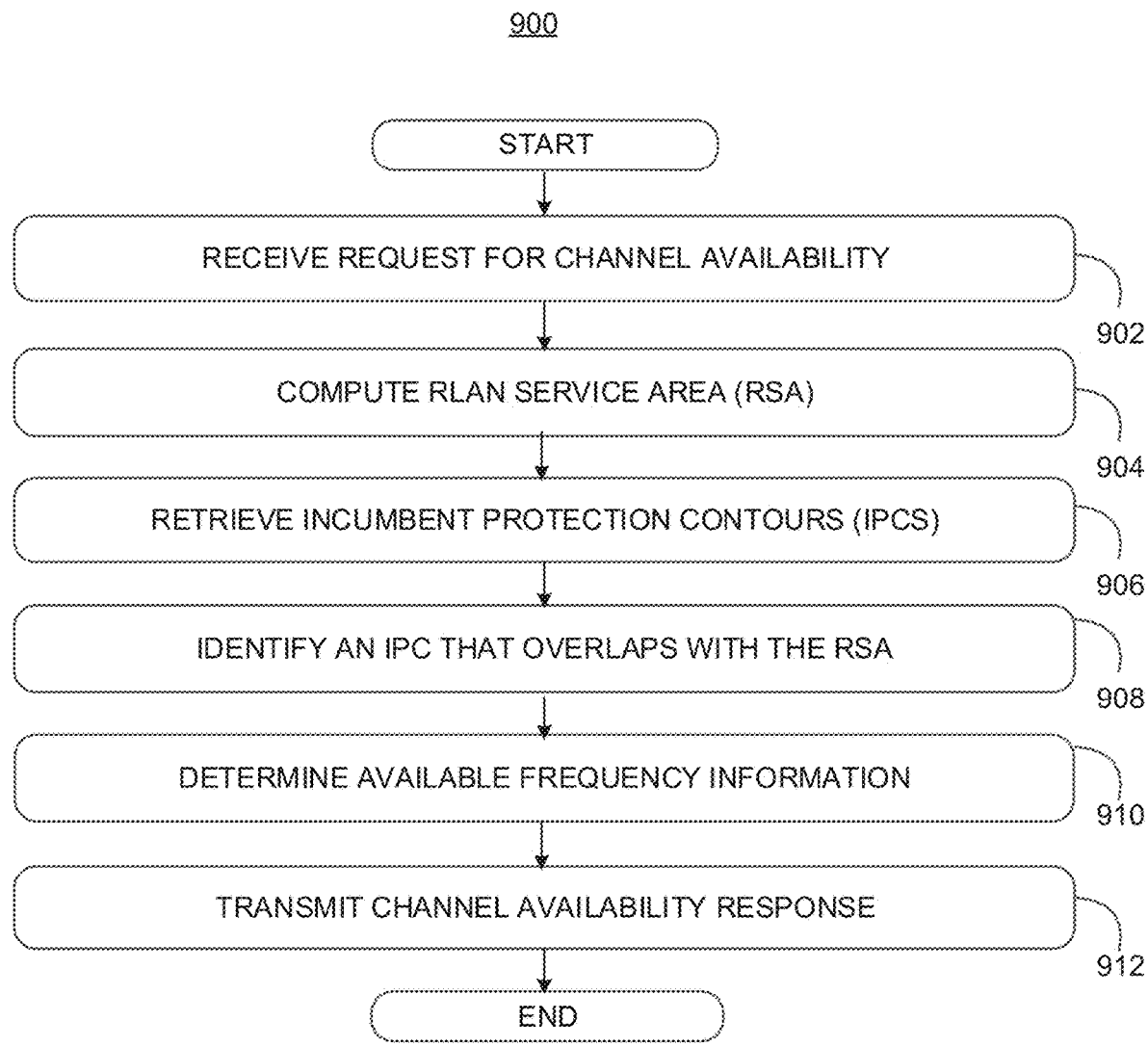
FIG. 9 depicts a flowchart of an exemplary method that an AFC system may perform for determining one or more available frequency channels that may be allocated to an RLAN AP in a shared spectrum wireless system in accordance with certain disclosed embodiments.

FIG. 9 depicts a flowchart of an exemplary method 900 that an AFC system may perform for determining one or more available frequency channels that may be allocated to an RLAN AP in a shared spectrum wireless system in accordance with certain disclosed embodiments. At step 902, the AFC system may receive a request for channel availability, such as the channel availability request 504 of FIG. 5, from the RLAN AP. The request for channel availability request may include one or more parameters associated with the RLAN AP. One or more parameters associated with the RLAN AP in the channel availability request may include, for example, an RLAN AP identifier, an RLAN AP location (e.g., the World Geodetic System (WGS84) coordinates), an RLAN AP EIRP (in dBm/MHz), an RLAN AP antenna AGL height (in meters), an RLAN cell edge RSL (in dBm/MHz), an RLAN AP category (e.g., whether the RLAN AP is indoors, outdoors, or mix), an RLAN AP horizontal uncertainty (in meters), and an RLAN AP vertical uncertainty (in meters).

At step 904, the AFC system may compute an RSA associated with the RLAN AP based on the one or more parameters associated with the RLAN AP received in the channel availability request. In some embodiments, the RSA may be determined by the limit at which a UE associated with the RLAN AP can receive control signals from the RLAN AP.

At step 906, the AFC system may retrieve IPCs associated with one or more incumbent users in the wireless network. IPCs may be pre-computed offline based on information obtained by the AFC system from the FCC Universal Licensing System (ULS) and Cable Operations and Licensing System (COALS) about the location, frequency, and other characteristics of the incumbent users. Then, the AFC system may store the pre-computed IPCs in an AFC database. As discussed above, the IPC may represent an area over which the RLAN AP operating on an incumbent frequency and transmitting power in the direction of the incumbent user would cause excess interference to the incumbent user. As shown in FIGS. 2-4, the IPC may correspond to a geographic boundary where the I/N levels are above a predetermined I/N threshold value for an incumbent user. Specifically, the IPC may represent the locations where the RLAN AP transmission would cause the overall I/N value at the incumbent user to exceed a predetermined interference threshold ($(I/N)_{threshold}$). Such a threshold value may be determined to cause significant degradation to the incumbent user's communications performance. In some embodiments, the AFC system may also use the reported parameters associated with the RLAN AP to choose a pre-calculated IPC around every incumbent user.

At step 908, the AFC system may identify an IPC, among the one or more IPCs retrieved, that overlaps with the RSA computed at step 904. Then, at step 910, the AFC system may determine available frequency information based on the identified IPC that overlaps with the computed RSA. For example, the permissible RLAN AP operating frequencies may be those where the computed RSA does not collide or overlap with any IPC. As such, the AFC system may use overlaps between one or more IPCs and the computed RSA to determine channel availability.

At step 912, the AFC system may transmit a channel availability response, such as channel availability response 506 of FIG. 5, to the RLAN AP. The channel availability response may comprise available frequency information to the RLAN AP. The channel availability response may also include, for example, the RLAN AP identifier and a list of available frequency channels in contiguous frequency increments with 1 Hz resolution.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, the exemplary disclosed embodiments are described in terms of interference-to-noise power contours, although those skilled in the art will appreciate that other criteria, such as signal-to-noise or carrier-to-noise ratios, compared to a threshold value may be used to determine the contours for incumbent users consistent with the disclosed embodiments herein. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps, performing steps in parallel, and/or inserting or deleting steps. It is intended, therefore, that the specification and examples be considered as illustrative only, with a true scope and spirit being indicated by the following claims and their full scope of equivalents.

What is claimed is:

1. A method for managing frequency channels in a shared spectrum available to a radio local access network (RLAN) access point (AP) in a wireless network, the method comprising:
    receiving a request for channel availability from the RLAN AP to access the shared spectrum;
    computing, based on a plurality of parameters associated with the RLAN AP, an RLAN service area (RSA) associated with the RLAN AP;
    retrieving one or more incumbent protection contours (IPCs) associated with one or more incumbent users in the wireless network;
    identifying an IPC, among the one or more retrieved IPCs, that overlaps with the RSA associated with the RLAN AP;

determining, based on the identified IPC, available frequency information corresponding to the received request for channel availability, wherein operating frequencies of an incumbent user associated with the identified IPC are unavailable to the RLAN AP; and transmitting, to the RLAN AP, a channel availability response comprising the available frequency information.

2. The method of claim 1, wherein the RSA comprises an outer contour that bounds an area surrounding the RLAN AP in which user equipments (UEs) associated with the RLAN AP operates.

3. The method of claim 2, further comprising computing the RSA to account for position uncertainty of the RLAN AP.

4. The method of claim 1, wherein the one or more IPCs comprises an outer contour that bounds an area around a respective incumbent user where an RLAN AP or a UE associated with an RLAN AP causes interference above a predetermined threshold.

5. The method of claim 4, wherein the predetermined threshold comprises an interference-to-noise power ratio (I/N) received by the respective incumbent user from the RLAN AP or the UE associated with the RLAN AP.

6. The method of claim 1, wherein the plurality of parameters associated with the RLAN AP comprises at least one of a location of the RLAN AP, an effective isotropic radiated power (EIRP) of the RLAN AP, an above ground level (AGL) height of the RLAN AP antenna, a horizontal uncertainty of the RLAN AP, a vertical uncertainty of the RLAN AP, a cell edge receive signal level (RSL) of the RLAN AP, an RSA propagation model (RPM) of the RLAN AP, a land category of the RLAN AP, or a device category of the RLAN AP.

7. The method of claim 1, wherein the one or more IPCs are pre-computed for the one or more incumbent users of the shared spectrum.

8. The method of claim 7, wherein the one or more IPCs are pre-computed based on an effective isotropic radiated power (EIRP) of the RLAN AP, an above ground level (AGL) height of the RLAN AP antenna, a device category of the RLAN AP, or a land category of the RLAN AP.

9. The method of claim 1, further comprising:
calculating an interference from the RLAN AP or a user equipment (UE) associated with the RLAN AP to an incumbent user of the one or more incumbent users using a link budget.

10. The method of claim 9, wherein the interference is calculated based on an effective isotropic radiated power (EIRP) transmitted by the RLAN AP or the UE in a direction of the incumbent user, a path loss between the RLAN AP or the UE and the incumbent user, and an antenna gain of the incumbent user in a direction of the RLAN AP or the UE.

11. A system for managing frequency channels in a shared spectrum available to a radio local access network (RLAN) access point (AP) in a wireless network, the system comprising:
one or more processors; and
a memory storing instructions that, when executed by the one or more processors, cause the system to:
receive a request for channel availability from the RLAN AP to access the shared spectrum;
compute, based on a plurality of parameters associated with the RLAN AP, an RLAN service area (RSA) associated with the RLAN AP;

retrieve one or more incumbent protection contours (IPCs) associated with one or more incumbent users in the wireless network;
identify an IPC, among the one or more retrieved IPCs, that overlaps with the RSA associated with the RLAN AP;
determine, based on the identified IPC, available frequency information corresponding to the received request for channel availability, wherein operating frequencies of an incumbent user associated with the identified IPC are unavailable to the RLAN AP; and
transmit, to the RLAN AP, a channel availability response comprising the available frequency information.

12. The system of claim 11, wherein the RSA comprises an outer contour that bounds an area surrounding the RLAN AP in which user equipments (UEs) associated with the RLAN AP operates.

13. The system of claim 12, wherein the instructions, when executed by the one or more processors, further cause the system to:
compute the RSA to account for position uncertainty of the RLAN AP.

14. The system of claim 11, wherein the one or more IPCs comprises an outer contour that bounds an area around a respective incumbent user where an RLAN AP or a UE associated with an RLAN AP causes interference above a predetermined threshold.

15. The system of claim 14, wherein the predetermined threshold comprises an interference-to-noise power ratio (I/N) received by the respective incumbent user from the RLAN AP or the UE associated with the RLAN AP.

16. The system of claim 11, wherein the plurality of parameters associated with the RLAN AP comprises at least one of a location of the RLAN AP, an effective isotropic radiated power (EIRP) of the RLAN AP, an above ground level (AGL) height of the RLAN AP antenna, a horizontal uncertainty of the RLAN AP, a vertical uncertainty of the RLAN AP, a cell edge receive signal level (RSL) of the RLAN AP, an RSA propagation model (RPM) of the RLAN AP, a land category of the RLAN AP, or a device category of the RLAN AP.

17. The system of claim 11, wherein the one or more IPCs are pre-computed for the one or more incumbent users of the shared spectrum.

18. The system of claim 17, wherein the one or more IPCs are pre-computed based on an effective isotropic radiated power (EIRP) of the RLAN AP, an above ground level (AGL) height of the RLAN AP antenna, a device category of the RLAN AP, a land category of the RLAN AP, and incumbent protection criteria.

19. The system of claim 11, wherein the instructions, when executed by the one or more processors, further cause the system to:
calculate an interference from the RLAN AP or a user equipment (UE) associated with the RLAN AP to an incumbent user of the one or more incumbent users using a link budget.

20. The system of claim 19, wherein the interference is calculated based on an effective isotropic radiated power (EIRP) transmitted by the RLAN AP or the UE in a direction of the incumbent user, a path loss between the RLAN AP or the UE and the incumbent user, and an antenna gain of the incumbent user in a direction of the RLAN AP or the UE.

21. A computer-readable medium comprising instructions that, when executed by at least one processor, cause the at least one processor to perform operations including:

receiving a request for channel availability from the RLAN AP to access the shared spectrum;

computing, based on a plurality of parameters associated with the RLAN AP, an RLAN service area (RSA) associated with the RLAN AP;

retrieving one or more incumbent protection contours (IPCs) associated with one or more incumbent users in the wireless network;

identifying an IPC, among the one or more retrieved IPCs, that overlaps with the RSA associated with the RLAN AP;

determining, based on the identified IPC, available frequency information corresponding to the received request for channel availability, wherein operating frequencies of an incumbent user associated with the identified IPC are unavailable to the RLAN AP; and transmitting, to the RLAN AP, a channel availability response comprising the available frequency information.

* * * * *